United States Patent [19]
Lim

[11] Patent Number: 5,444,491
[45] Date of Patent: Aug. 22, 1995

[54] TELEVISION SYSTEM WITH MULTIPLE TRANSMISSION FORMATS

[75] Inventor: Jae S. Lim, Winchester, Mass.

[73] Assignee: Massachusetts Institute of Technology, Cambridge, Mass.

[21] Appl. No.: 350,495

[22] Filed: Dec. 6, 1994

Related U.S. Application Data

[63] Continuation of Ser. No. 23,802, Feb. 26, 1993, abandoned.

[51] Int. Cl.$^6$ .............................................. H04N 7/01
[52] U.S. Cl. ................................. 348/441; 348/555; 348/558
[58] Field of Search ............... 348/441, 443, 445, 446, 348/448, 449, 458, 459, 555, 556, 558; H04N 7/01

[56] References Cited

U.S. PATENT DOCUMENTS

| | | | |
|---|---|---|---|
| 3,781,818 | 12/1973 | Pardoe et al. | 340/172.5 |
| 3,912,872 | 10/1975 | Callens | 179/158 A |
| 4,198,651 | 4/1980 | Barton et al. | 358/21 V |
| 4,309,719 | 1/1982 | Hinn | 348/555 |
| 4,611,225 | 9/1986 | Powers | 358/140 |
| 4,641,188 | 2/1987 | Dischert | 358/140 |
| 4,679,091 | 7/1987 | Kikuchi et al. | 358/242 |
| 4,688,082 | 8/1987 | Kato | 348/555 |
| 4,759,018 | 7/1988 | Buchner | 370/112 |
| 4,838,685 | 6/1989 | Martinez et al. | 352/85 |
| 4,843,468 | 6/1989 | Drewery | 358/140 |
| 4,860,098 | 8/1989 | Murphy | 358/139 |
| 4,881,125 | 11/1989 | Krause | 358/140 |
| 4,931,855 | 6/1990 | Salvadorini | 358/141 X |
| 4,961,112 | 10/1990 | Sugimori et al. | 358/141 |
| 4,962,428 | 10/1990 | Tong et al. | 358/188 |

(List continued on next page.)

OTHER PUBLICATIONS

Monta et al., "Source Adaptive Processing for ATV Systems Design," 132nd SMPTE Technical Conference, New York (Oct. 13-17, 1990).

Parulski et al., "Source-Adaptive Encoding Options for HDTV and NTSC," SMPTE Journal, pp. 674-683 (Oct. 1992).

"Proposed Improvements for CCDC HDTV System," Massachusetts Institute of Technology on behalf of the American Television Alliance (Nov. 2, 1992).

Martinez et al., U.S. Patent Application No. 07/842,779 (file wrapper of U.S. Patent Application No. 07/421,152).

Faroudja et al., "Improving NTSC to Achieve Near-RGB Performance", SMPTE Journal, pp. 750-761 (Aug. 1987).

Faroudja et al., "A Progress Report on Improved NTSC", SMPTE Journal, pp. 817-822 (Nov. 1989).

Lim, *Two Dimensional Signal and Image Processing*, pp. 513-515, 577-580, 671-673, Prentice Hall (1990).

Pratt, W. K., *Digital Image Processing*, John Wiley & Sons, Inc., pp. 591-735 (1978).

(List continued on next page.)

*Primary Examiner*—Victor R. Kostak
*Attorney, Agent, or Firm*—Fish & Richardson

[57] ABSTRACT

A television receiver for receiving and decoding a transmitted television signal, wherein the television signal comprises a succession of encoded image frames encoded in transmission formats selected from a set of transmission formats, the set comprising at least two transmission formats that differ from each other in at least two non-program-content characteristics; wherein the receiver comprises: display means for displaying the television signal; means for receiving format identification information transmitted with the encoded image frames identifying the transmission format of the received frames; means for decoding the identification information to determine the transmission format of the encoded image frames being received; and means for using the identification information to decode the encoded image frames for any of the transmission formats.

93 Claims, 9 Drawing Sheets

U.S. PATENT DOCUMENTS

| | | | |
|---|---|---|---|
| 4,967,273 | 10/1990 | Greenberg | 358/142 |
| 5,010,392 | 4/1991 | Croll | 348/555 |
| 5,010,405 | 4/1991 | Schreiber et al. | 358/141 |
| 5,025,309 | 6/1991 | Isnardi | 358/141 X |
| 5,083,205 | 1/1992 | Arai | 348/555 |
| 5,132,793 | 2/1992 | Hirahata et al. | 358/141 X |
| 5,138,659 | 8/1992 | Kelkar | 348/441 X |
| 5,187,575 | 2/1993 | Lim | 358/140 |
| 5,218,436 | 6/1993 | Sugiyama et al. | 358/141 |
| 5,235,427 | 8/1993 | Yang | 358/141 |

OTHER PUBLICATIONS

Schreiber, "Improved Television Systems: NTSC and Beyond", SMPTE Journal, vol. 66, No. 8 (Aug. 1987).

Schreiber, "Psychophysics and the Improvement of Television Image Quality", SMPTE Journal, vol. 93, No. 8 (Aug. 1984).

Schreiber et al., "Reliable EDT/HDTV Transmission in Low-Quality Analog Channels", SMPTE Journal, pp. 496–503 (Jul. 1989).

"System Improvements Approved for CCDC HDTV System", submitted by Massachusetts Institute of Technology on behalf of The American Television Alliance (Nov. 23, 1992).

"Channel Compatible DigiCipher HDTV System", submitted by Massachusetts Institute of Technology on behalf of The American Television Alliance (May 14, 1992).

TELEVISION SYSTEM WITH MULTIPLE TRANSMISSION FORMATS

This is a continuation of application Ser. No. 08/023,802, filed Feb. 26, 1993, now abandoned.

BACKGROUND OF THE INVENTION

This invention relates to image transmission systems, such as advanced television systems.

Scanning format is a consideration in the design of image transmission systems. Two formats typically considered are progressive and interlaced scanning. Each format breaks up an image into an array of lines. In a progressive scanning system, each of a succession of image frames contains all of the lines representing an image. In an interlaced scanning system, there are a succession of fields, each containing half of the lines of an image; every other field contains the odd lines of the image, and the other fields contain the even lines. Interlacing can reduce the data rate of the television camera or receiver, as only half of the pixels forming an image are processed for each field.

Both interlaced and progressive scanning have been proposed for advanced television systems (e.g., for the United States HDTV standard). Progressive scanning produces better image quality; artifacts (e.g., flicker) resulting from interlaced scanning are avoided, and smoother motion rendition is achieved (important, e.g., for sporting events). Progressive scanning also has the advantage of being easier to interface with computers and telecommunication networks. But interlaced scanning has the advantage of being compatible with existing production and display technology, and thus would, at least in the short run, reduce the cost of implementing an advanced television system. For the same bandwidth, interlaced scanning is also capable of producing a greater number of lines than progressive scanning, and this is viewed by some of its proponents as producing improved spatial resolution and image sharpness.

Television source material has certain non-program-content characteristics, such as frame rate, spatial resolution, and scanning format (such as interlaced or progressive). Conventional television transmission systems convert the source material to a common format prior to transmission, so that these non-program-content characteristics are not retained. For example, 24 frame-per-second film is converted to 60 fields-per-second video using the 3:2 pull-down method, and low spatial resolution material is converted to the same resolution as high resolution material.

My U.S. Pat. No. 5,187,575 (hereby incorporated by reference) teaches that some non-program-content characteristics (e.g., frame rate, spatial resolution, scanning format) can be retained in the transmitted signal with resulting improvement in image quality.

SUMMARY OF THE INVENTION

In a first aspect, the invention features a television receiver for receiving and decoding a transmitted television signal, wherein the television signal comprises a succession of encoded image frames encoded in a plurality of different transmission formats selected from a set of transmission formats, the set comprising at least two transmission formats that differ from each other in at least two non-program-content characteristics; wherein the receiver comprises: means for receiving format identification information transmitted with the encoded image frames identifying the transmission format of the received frames; means for decoding the identification information to determine the transmission format of the encoded image frames being received, wherein the identification information and transmission formats can change during receipt of the television signal; and means for using the identification information to decode the encoded image frames for some of the transmission formats.

In preferred embodiments, the non-program-content characteristics by which the transmission formats differ include spatial resolution and frame rate. The transmission formats comprise at least three of the following four formats: a low-spatial-resolution, low-frame-rate transmission format, a low-spatial-resolution, high-frame-rate transmission format, a high-spatial-resolution, low-frame-rate transmission format, and a high-spatial-resolution, high-frame-rate transmission format. Alternatively, the transmission formats comprise at least a low-spatial-resolution, high-frame-rate transmission format, and a high-spatial-resolution, low-frame-rate transmission format. The receiver includes format transformation means for using the decoded identification information to transform the format of the encoded image frames from any of the transmission formats to the display format. The display format is different from at least some of the transmission formats. The spatial resolution ratio between the low-spatial-resolution transmission formats and the high-spatial-resolution formats is a ratio of integers, wherein the integers range from one to ten in value. The receiver of claim 7 wherein the ratio of integers is selected from the group consisting of 3:2 and 2:1. Each of the transmission formats are progressively scanned, and wherein the low-spatial-resolution format has approximately 720 lines of pixels, and the high-spatial-resolution format has approximately 1080 lines of pixels. The low-frame-rate transmission format has a frame rate of 24 frames per second, and the high-frame-rate transmission format has a frame rate of 30 frames per second. The set of transmission formats comprises each of the four formats mentioned above plus a fifth format: a low-spatial-resolution, higher-frame-rate format that has a higher frame rate than that of the low-spatial-resolution, high-frame-rate format. The higher frame rate is 60 frames per second. Each of the transmission formats are progressively scanned formats. The display format can use interlaced or progressive scanning. The receiver can have a second display format and means for selectively transforming the received image frames from the transmission format to either the first or second display format. The format transformation means comprises means for spatial interpolation for processing encoded image frames with a transmission format having a spatial resolution lower than the spatial resolution of the display format. The format transformation means comprises means for temporal interpolation for processing encoded image frames with a transmission format having a frame rate lower than the frame rate of the display format. The format transformation means comprises means for spatial subsampling for processing encoded image frames with a transmission format having a spatial resolution greater than the spatial resolution of the display format. The format transformation means comprises means for temporal subsampling for processing encoded image frames with a transmission format having a frame rate greater than the frame rate of the display format.

In a second aspect, the invention feature a system for receiving a production television signal having one of a plurality of production formats, processing the production television signal to produce a succession of encoded image frames having a transmission format selected from a set of transmission formats, the set comprising at least two transmission formats that differ from each other in at least two non-program-content characteristics; wherein the television system comprises: means for receiving production format identification information identifying the production format of the production television signal; format transformation means for using the production format identification information to transform the television signal from the production format to one of the transmission formats; means for processing the television signal to produce the succession of encoded image frames in the transmission format; and means for encoding and transmitting transmission format identification information with the encoded image frames to identify the transmission format, wherein the identification information and transmission formats can change during transmission of the television signal.

In preferred embodiments, the production formats include interlaced scanning formats, the transmission formats include progressive scanning formats, and the format transformation means includes means for transforming the interlaced production formats to progressive formats. The production formats include at least two formats having different frame rates and the format transformation means retains at least a portion of that difference in frame rate, so that the resulting transmission formats retain at least a portion of that difference in frame rate. The production formats include at least two formats having different spatial resolutions and the format transformation means retains at least a portion of that difference in spatial resolution, so that the resulting transmission formats retain at least a portion of that difference in spatial resolution.

The invention has several important advantages, and should be of tremendous benefit to the development of advanced television systems such as HDTV. By separating production, transmission, and display formats, it becomes possible to design an advanced television system that encompasses multiple transmission formats. Although such an approach seems complicated on first impression, it has an elegant simplicity.

In preferred embodiments, in which all of the transmission formats are progressive scan (PS), the invention permits an advanced television system to make use of existing interlaced scan (IS) production and display technologies, while ensuring that the goal of a full PS system can be reached in the future. It achieves this ability to accommodate both existing IS technology and emerging PS technology with a small degradation in IS performance (because of transformations to and from PS transmission formats), but this turns out to be an acceptable compromise, in that it is assured that the better performing PS technology can be accommodated in the future without any performance penalty.

By providing the PS transmission formats sports events can be viewed in true 60 frame-per-second (fps) with corresponding smooth motion rendition. At the same time, the set of preferred transmission formats provides a 1080-line progressively scanned 30 frame-per-second (fps) or 24 fps transmission format capable of providing spatial resolution of more than 1000 lines for movies, commercials, and other images that benefit primarily from higher resolution.

Other features of the invention will be apparent from the following description of a preferred embodiment and from the claims.

DESCRIPTION OF THE PREFERRED EMBODIMENTS

Table 1 gives the preferred transmission formats for an HDTV system. Although five are shown, as few as two formats, e.g., 720×1280 pixels progressively scanned at 60 frames per second (720-line PS at 60 fps) and 1080×1920 pixels PS at 30 fps (1080-line PS at 30 fps) could be used by themselves.

TABLE 1

| Frame Size | Frame Rate | Scan Mode | Total Pixels/Sec |
| --- | --- | --- | --- |
| 720 × 1280 pixels | 60 fps | PS | 55M |
| 720 × 1280 pixels | 30 fps | PS | 28M |
| 720 × 1280 pixels | 24 fps | PS | 22M |
| 1080 × 1920 pixels | 30 fps | PS | 62M |
| 1080 × 1920 pixels | 24 fps | PS | 50M |

Table 2 gives additional transmission formats for possible future use or for special purpose use.

TABLE 2

| Frame Size | Frame Rate | Scan Mode | Total Pixels/Sec |
| --- | --- | --- | --- |
| 1080 × 1920 pixels | 60 fps | PS | 124M |
| 1080 × 1920 pixels | 12 fps | PS | 25M |
| 1440 × 2560 pixels | 60 fps | PS | 221M |
| 1440 × 2560 pixels | 30 fps | PS | 111M |
| 1440 × 2560 pixels | 20 fps | PS | 74M |
| 1440 × 2560 pixels | 12 fps | PS | 44M |
| 720 × 1280 pixels | 72 fps | PS | 66M |
| 1080 × 1920 pixels | 72 fps | PS | 149M |

TABLE 2-continued

| Frame Size | Frame Rate | Scan Mode | Total Pixels/Sec |
|---|---|---|---|
| 1440 × 2560 pixels | 72 fps | PS | 265M |

The number of lines given in the tables are the number of active lines, i.e., the number of lines containing information ordinarily displayed. All of the formats have a 16:9 aspect ratio, which is currently preferred for an HDTV system. Other aspect ratios could be used. There are two spatial resolutions in Table 1, and they differ by a factor of 1.5, or 3:2. Preferably the difference in resolutions between formats differ by a ratio of simple whole integers in the range of one to ten. E.g., 5:2, 2:1, 3:2. Use of these ratios simplifies the computations involved in the format transformations.

The total number of pixels/sec for each of the five formats of Table 1 is less than 63M pixels/sec, and thus each can be transmitted within the 6 MHz terrestrial broadcast channel proposed for HDTV, as it is possible using known video compression techniques to handle as much as 70–80M pixels/sec in such a channel.

In some of the figures and discussion below, only two of the five formats of Table 1 (720-line PS at 60 fps and 1080-line PS at 30 fps) are discussed. Just these two formats (or another two formats that differ in two non-program-content characteristics, e.g., spatial resolution and frame rate) could be used instead of the full set of five formats. But the techniques discussed in connection with these two apply generally to the other three formats in Table 1.

It is important to note that the transmitter can switch between formats (e.g., between 720-line PS at 60 fps and 1080-line PS at 30 fps) at any time. For example, for a sports event, the 720-line PS at 60 fps format might be used to improve motion rendition, while the 1080-line PS at 30 fps format might be used during the commercial break.

Figure 1:
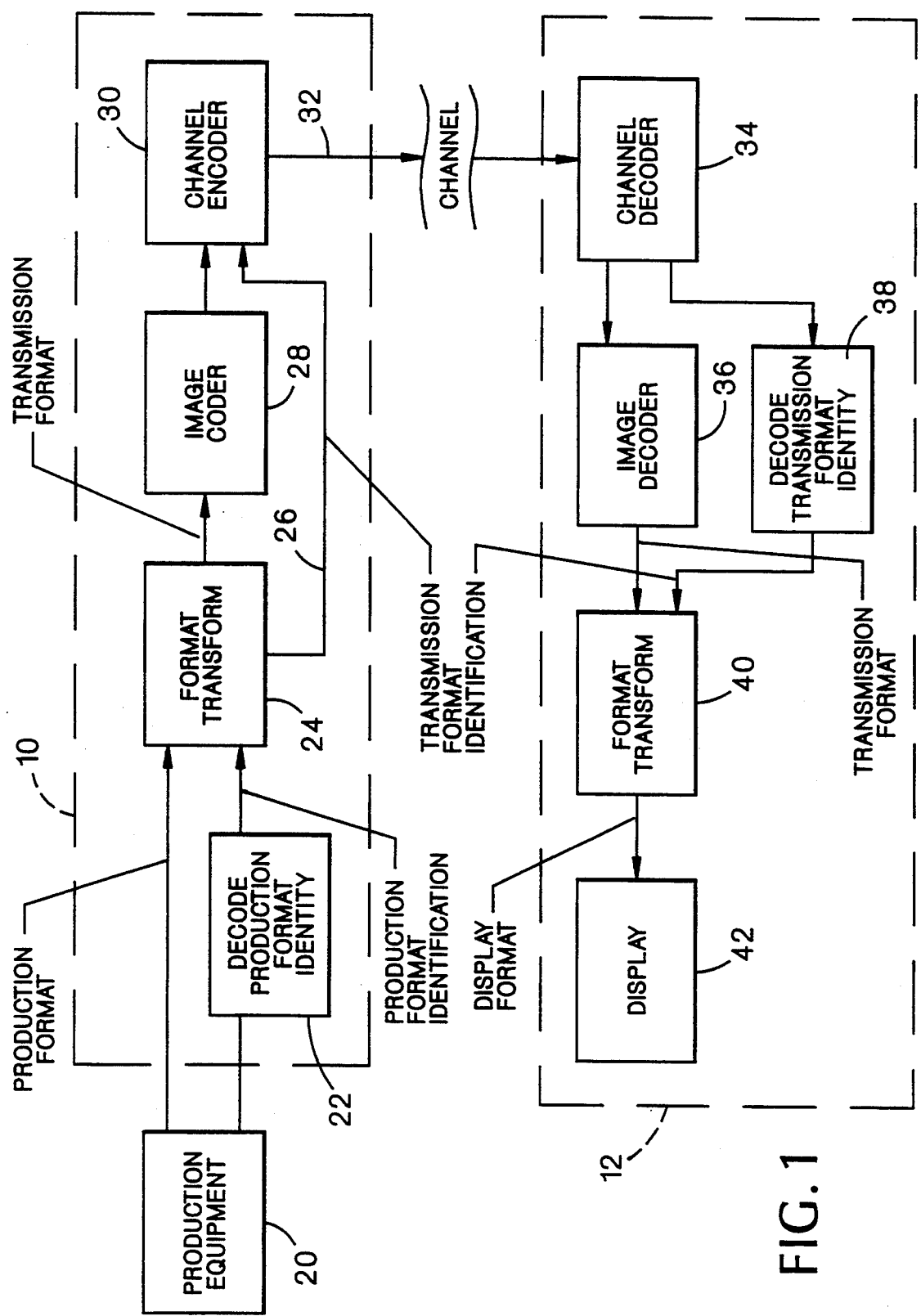
FIG. 1 is a block diagram of a preferred embodiment of the invention.

FIG. 1 is a block diagram of the transmitter 10 and receiver 12 of the preferred embodiment. Production equipment 20 produces a television signal having a production format. Using current technology, these production formats might be 1080-line IS at 60 fields per second (which can be obtained from an 1125-line IS camera) or 720-line PS at 60 fps. (Note that 1125 lines is the total number of lines, while the 1080 lines in a 1080-line IS format refers to the number of active lines; other numbers of active lines, e.g., 1050, can also be generated from an 1125-line camera.) In the near future, it can be expected that production formats of 1080-line PS at 60 fps and 1440-line PS at 60 fps will be used, both of which are readily accommodated by the preferred transmission formats.

Identification information identifying the production format must be supplied in some manner. In FIG. 1, decoder 22 decodes it from an electrical signal output by the production equipment, but it could also be supplied via a keyboard or other input means at the transmitter.

The production format signal and identification information are supplied to format transformation means 24, which converts the format to one of the transmission formats of Table 1, and also supplies a transmission format identification signal 26. The transformed signal is then coded by image coder 28, and the coded frames and identification information are encoded by channel encoder 30, to produce the transmitted signal 32.

The receiver 12 receives the transmitted signal and supplies it to channel decoder 34, which in turn outputs image information to the image decoder 36 and transmission format identification information to decoder 38. The output of the image decoder is supplied to format transformation means 40, which uses the decoded format identification information to transform the decoded image frames from the transmission format to the display format, so that the frames supplied to the display 42 are in the format used by the display. Ordinarily, the receiver would have a single display format, but multiple formats could be used in some receivers. In the latter case the format transformation means would be supplied with the choice of display format to be used at any given time.

Identification information identifying the transmission format of particular frames is included in the frame header, and the receiver 12 automatically adapts itself to convert the transmission format to the receiver's display format based on the identification information decoded from the frame header. Although a multi-sync receiver could be used, it is not necessary, as the transformation from transmission format to display format can be done by the processor, prior to display.

Figure 2:
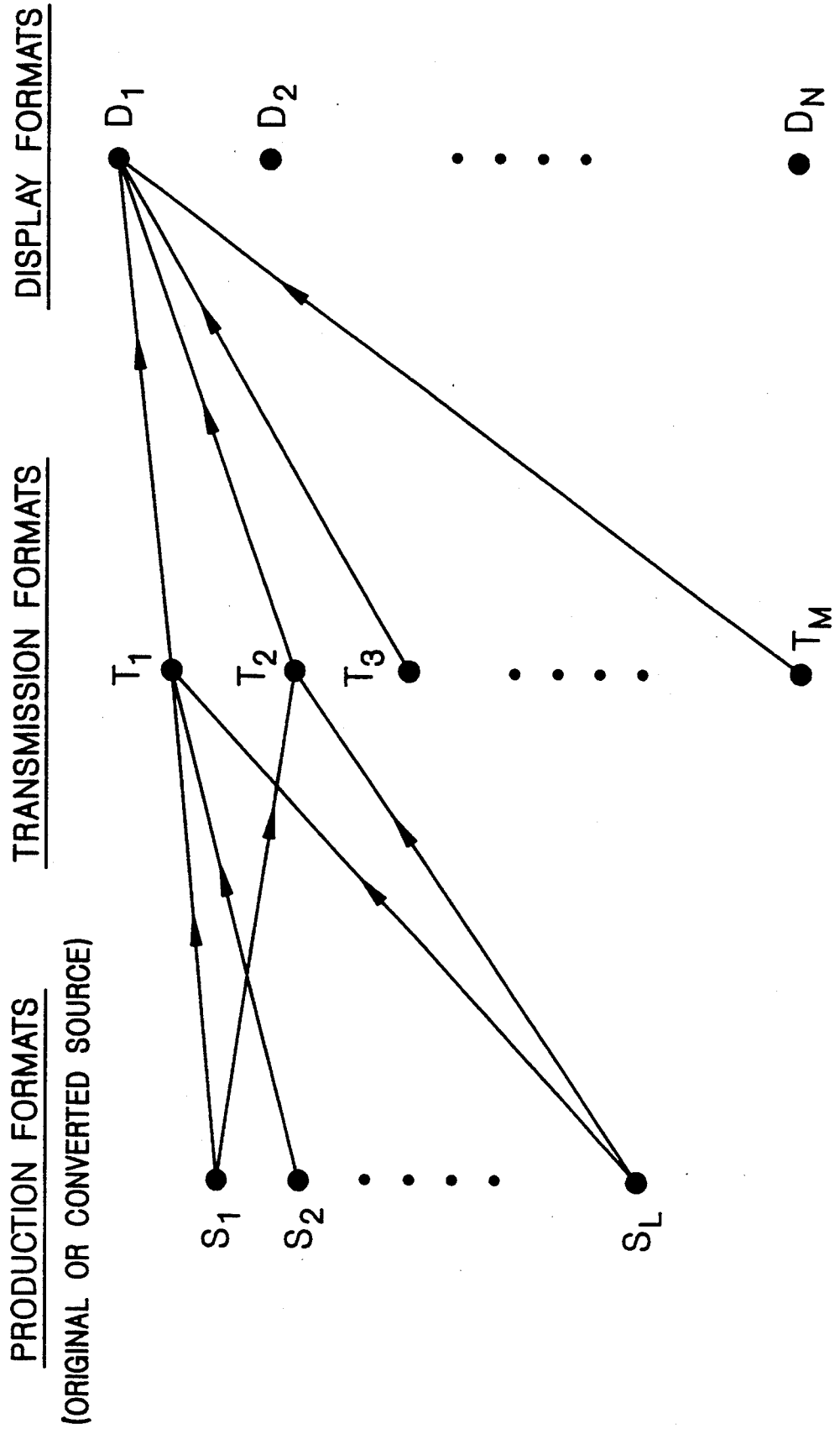
FIG. 2 is a diagrammatic illustration of the relationship between production (source) formats, transmission formats, and display formats, for the preferred embodiment.

FIG. 2 shows the relationship between production (source) formats $S_1, S_2, \ldots S_L$, transmission formats $T_1, T_2, T_3, \ldots T_M$, and display formats $D_1, D_2, \ldots D_N$. Although the five transmission formats of Table 1 are preferred, as few as two formats could be used, so long as they each differ in at least two non-program-content characteristics (e.g., frame rate and spatial resolution). A particular production format, e.g., $S_1$, may be transformed into one or a plurality of the transmission formats. The receiver must ordinarily be equipped to decode the image frame based on any of the transmission formats and to transform any of the transmission formats into the receiver's display format. A receiver that cannot decode the image frame for some transmissions formats would, of course, be disadvantaged relative to those than can. Although as mentioned, a single display format will ordinarily suffice, there may be circumstances in which multiple display formats are used.

Figure 3:
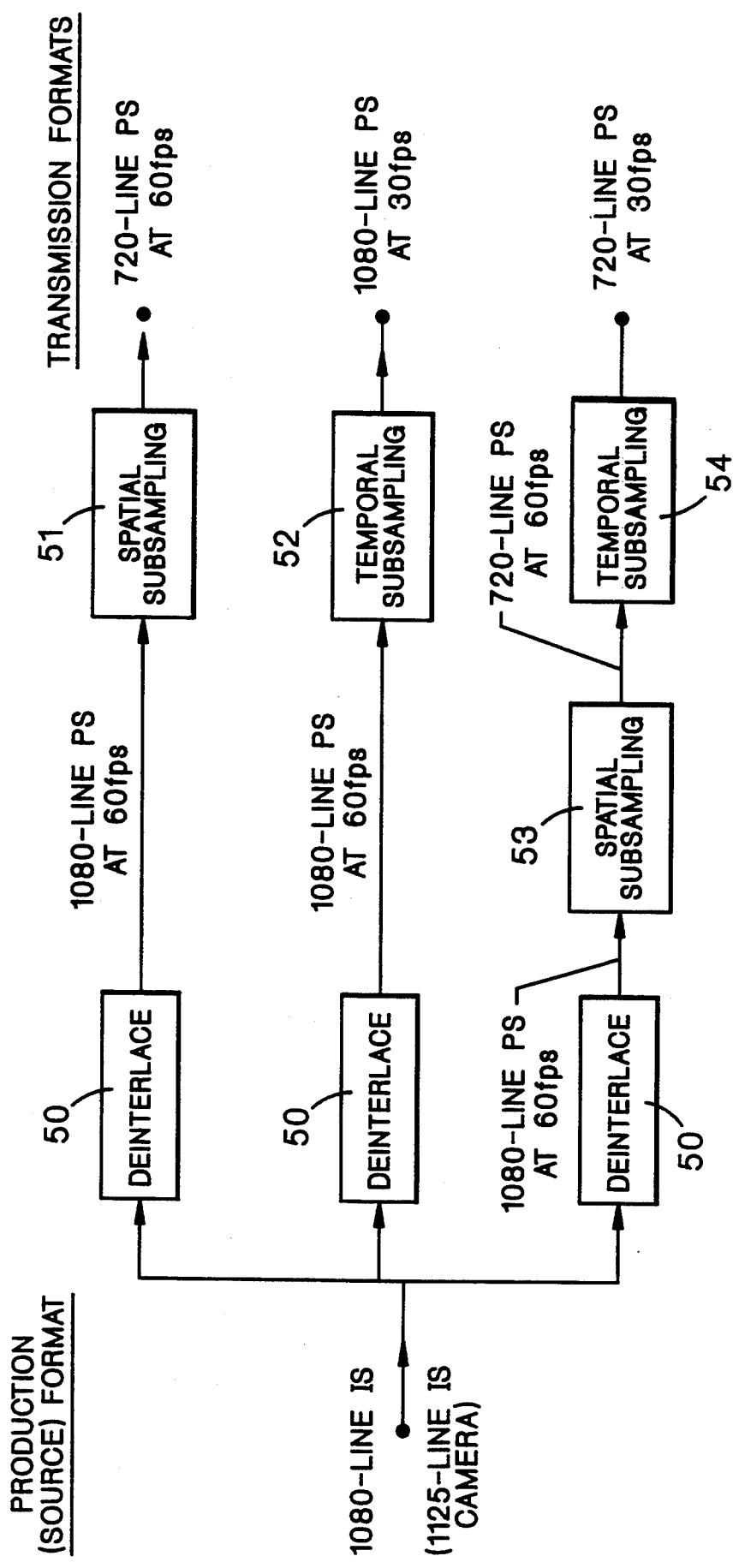
FIG. 3 is a block diagram showing examples of transformations of production format to transmission format.

FIG. 3 shows how 1080-line IS (as generated by existing 1125-line IS cameras) can be converted by format transformation means 24 (FIG. 1) to 720-line PS at 60 fps, 1080-line PS at 30 fps, and 720-line PS at 30 fps. The 1080-line IS format can be converted to 720-line PS at 60 fps by deinterlacing 50 and spatial subsampling 51. The 1080-line IS can be converted to 1080-line PS at 30 fps by known deinterlacing 50 and temporal subsampling 52. The 1080-line IS format can be converted to 720-line PS at 30 fps by deinterlacing 50, followed by spatial subsampling 53, and temporal subsampling 54.

Figure 4:
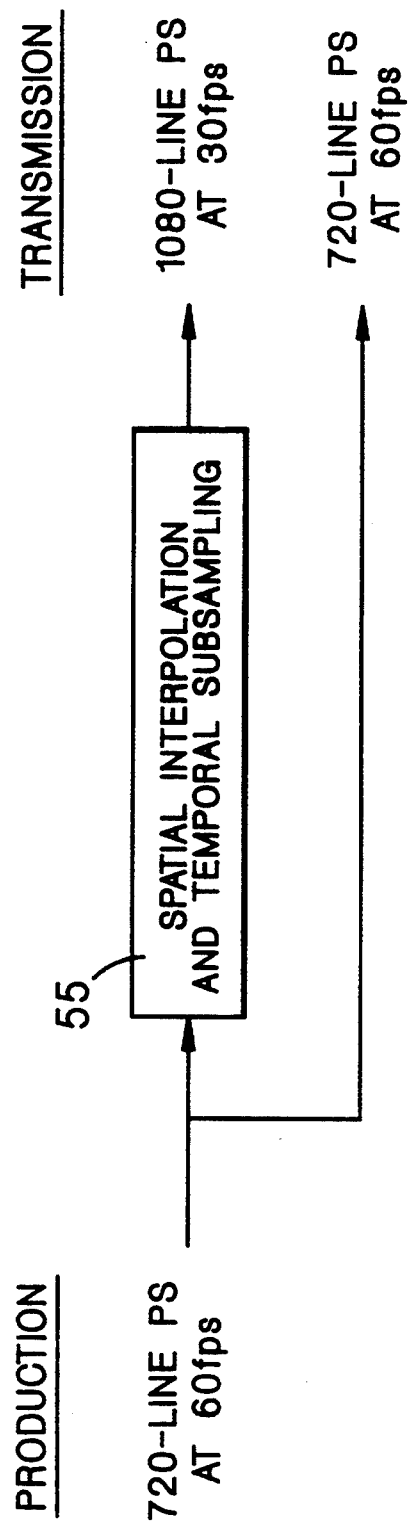
FIG. 4 is a block diagram showing further examples of transformations of production format to transmission format.

FIG. 4 shows how the format transformation means 24 can convert a 720-line PS at 60 fps production signal to 1080-line PS at 30 fps by spatial interpolation and temporal subsampling 55. Alternatively, the 720-line PS at 60 fps could be used without transformation as it is one of the preferred transmission formats (Table 1).

The techniques employed by the format transformation means for deinterlacing, spatial interpolation, spatial subsampling, and temporal subsampling are all known by those skilled in the art.

It is expected that some or all of the transformations shown in FIGS. 3 and 4 will not be required after the improved PS production technologies mentioned earlier are developed.

Figure 5:
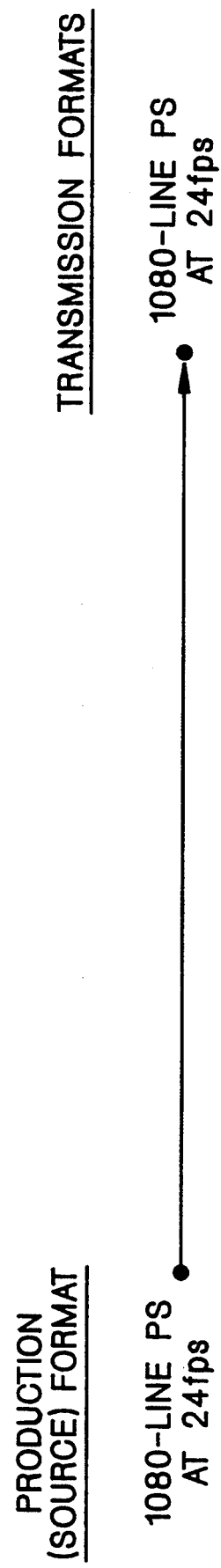
FIG. 5 is a block diagram showing the retention of 24 fps frame rate in a transmission format.

FIG. 5 gives an example of a production format not requiring any transformation. The production format 1080-line at 24 fps matches one of the transmission formats of Table 1, and is used without transformation. By retaining the lower frame rate (non-program-content characteristic), a greater number of bits can be devoted to encoding each frame (more bits per pixel) with resulting improvement in image quality. If instead of 1080-line PS at 24 fps, the production format had been 1080-line IS at 24 fields per second, it would have been necessary to transform the production format to one of the transmission formats, but preferably that transformation would be done without changing the frame rate, so that the benefits of retaining that non-program-content characteristic are preserved.

Turning back to FIG. 1, to the receiver 12, the display 42 could have a variety of display formats. Initially, the display is likely to use existing display technologies, and thus it might have a 1080-line IS (1125-line IS display) or a 720-line PS at 60 fps format. In the future, its format might improve to 1080-line PS at 60 fps.

Figure 6:
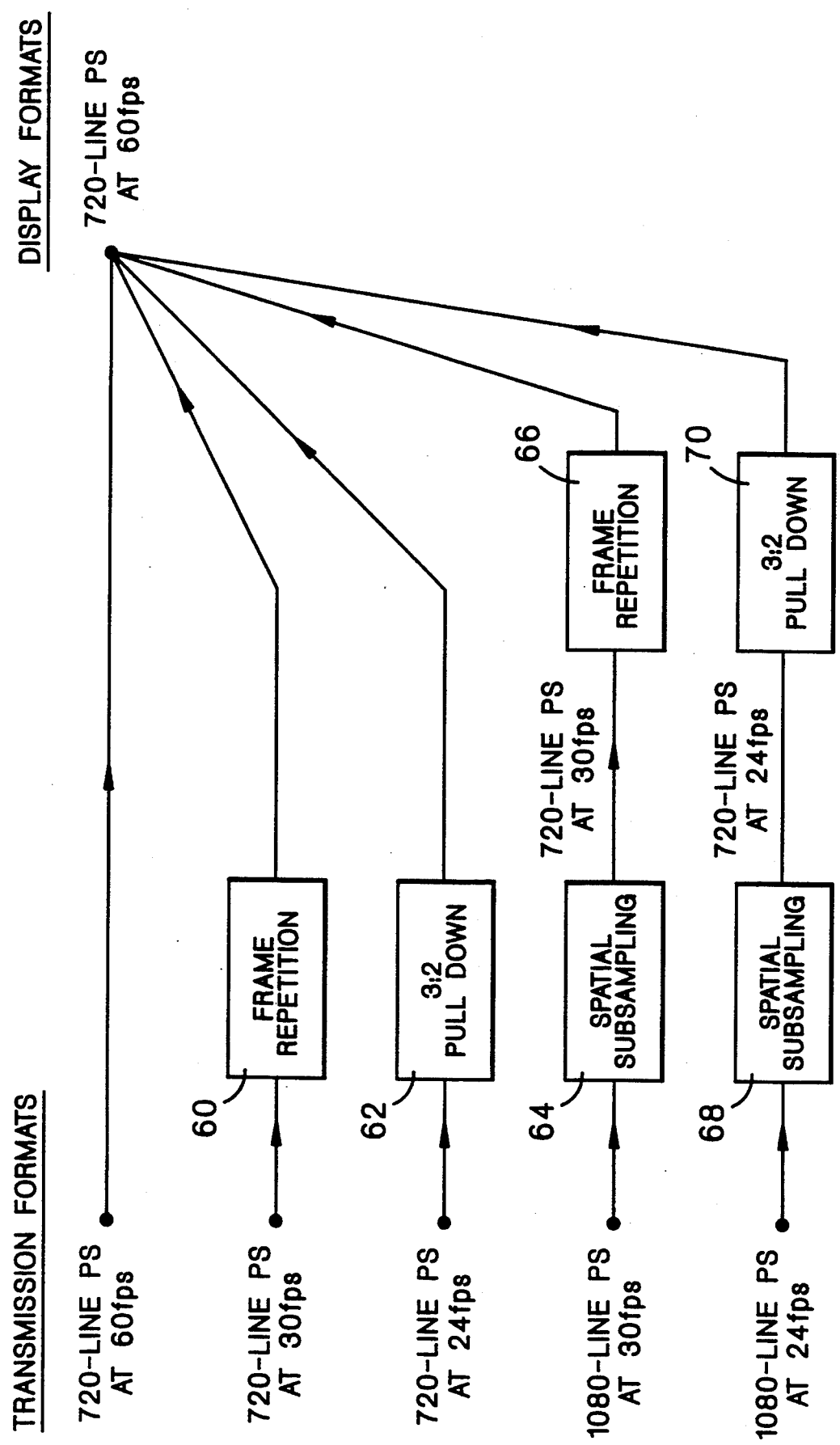
FIG. 6 is a block diagram showing transformation of each of the five preferred transmission formats to one display format.

FIG. 6 shows the transformation techniques used by the receiver's format transformation means 40 for a 720-line PS at 60 fps display (an existing display technology). Each of the five preferred transmission formats shown in Table 1 is converted to the 720-line PS at 60 fps display format. No transformation is required for the 720-line PS at 60 fps transmission format. The 720-line PS at 30 fps transmission can be transformed by simple frame repetition 60. The 720-line PS at 24 fps can be transformed by the well known 3:2 pull-down process 62. The 1080-line PS at 30 fps can be transformed by spatial subsampling 64 and frame repetition 66. The 1080-line PS at 24 fps can be transformed by spatial subsampling 68 and 3:2 pull-down process 70. Different transformation techniques would be used for different display technologies.

Figure 7:
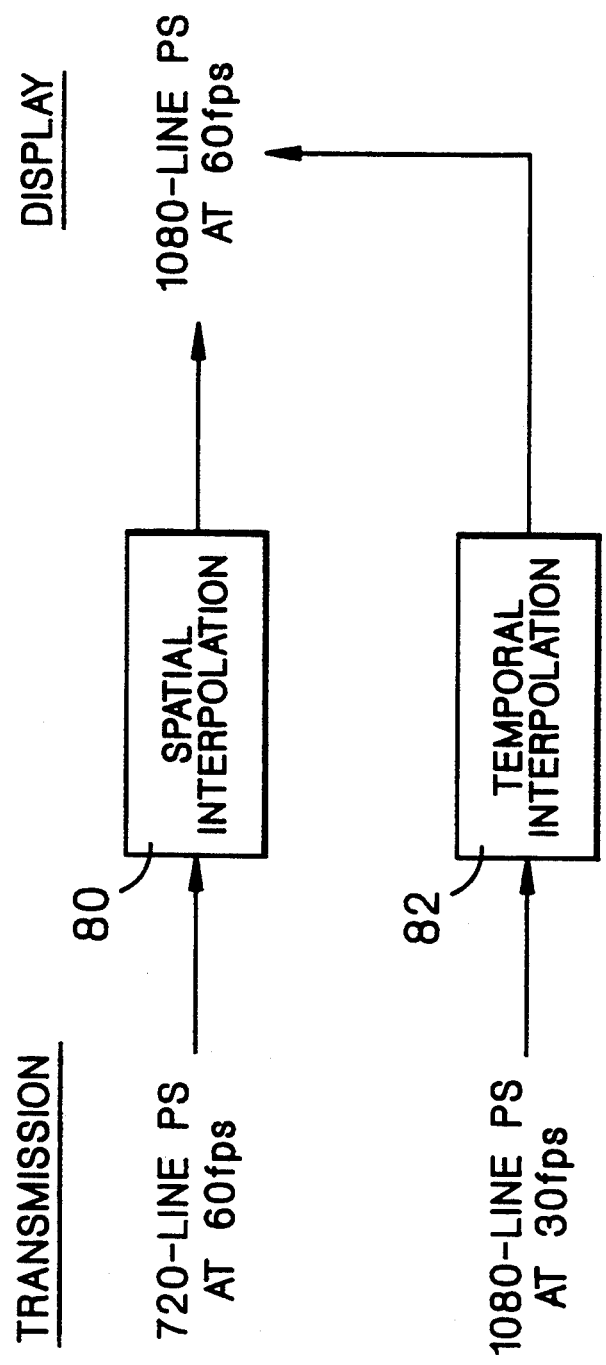
FIG. 7 is a block diagram showing transformation of two of the five preferred transmission formats to another display format.

FIG. 7 shows techniques for transforming two of the five transmission formats to another display format, 1080-line PS at 60 fps (a technology that is expected to be developed in the future at reasonable cost). Spatial interpolation 80 can be used to transform 720-line PS at 60 fps, and temporal interpolation 82 can be used to transform 1080-line PS at 30 fps.

Figure 8:
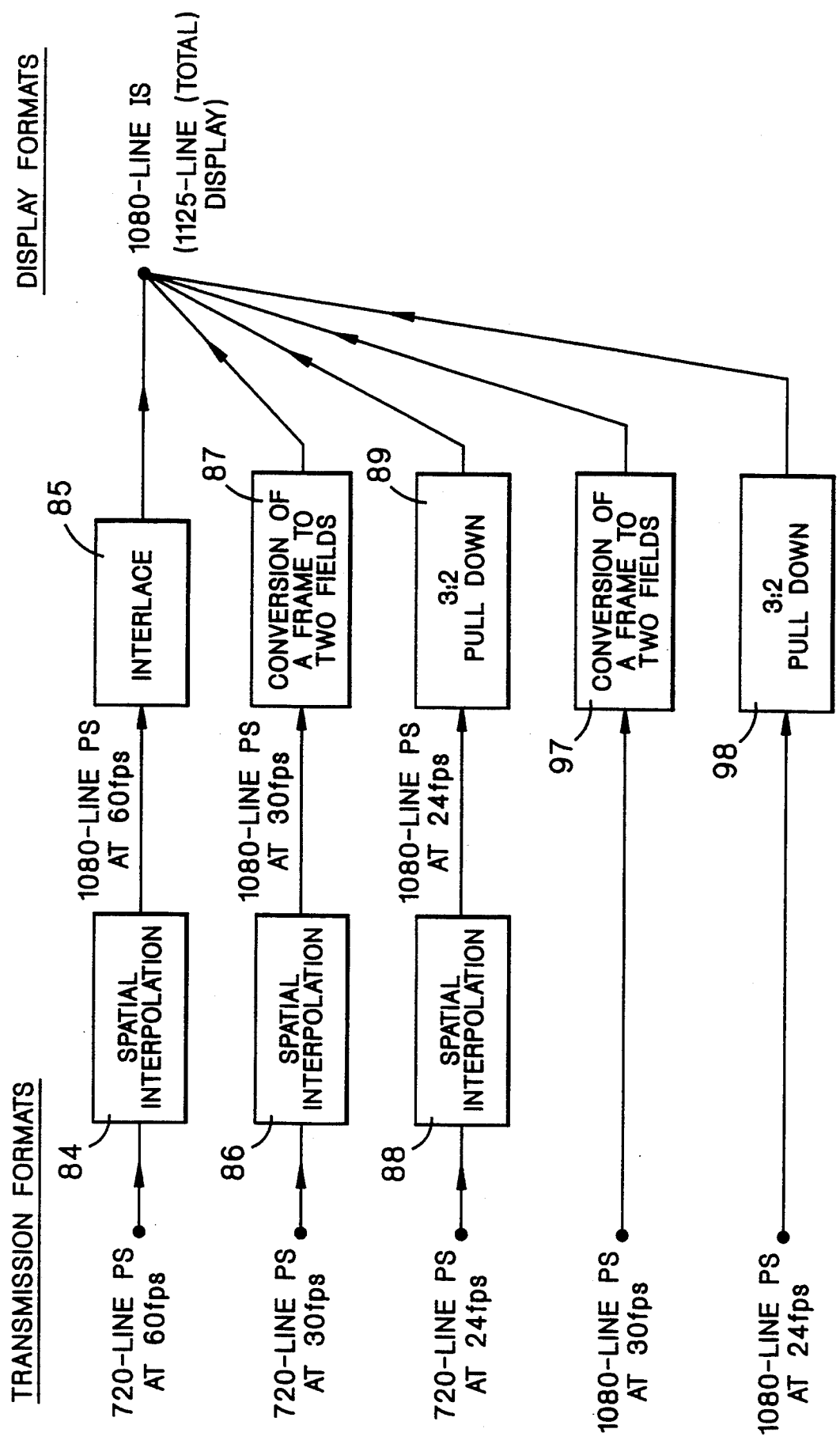
FIG. 8 is a block diagram showing transformation of each of the five preferred transmission formats to a third display format.

FIG. 8 shows techniques for transforming the five transmission formats to an interlaced display format, 1080-line IS (another existing display technology). Spatial interpolation 84 and interlacing 85 can be used to transform 720-line PS at 60 fps. Spatial interpolation 86 and conversion of a frame to two fields at 87 can be used to transform 720-line PS at 30 fps. Spatial interpolation 88 and the 3:2 pull-down process 89 can be used to convert 720-line at 24 fps. Conversion of a frame to two fields (97) can be used to convert 1080-line PS at 30 fps. The 3:2 pull-down process 98 can be used to convert 1080-line PS at 24 fps.

Figure 9:
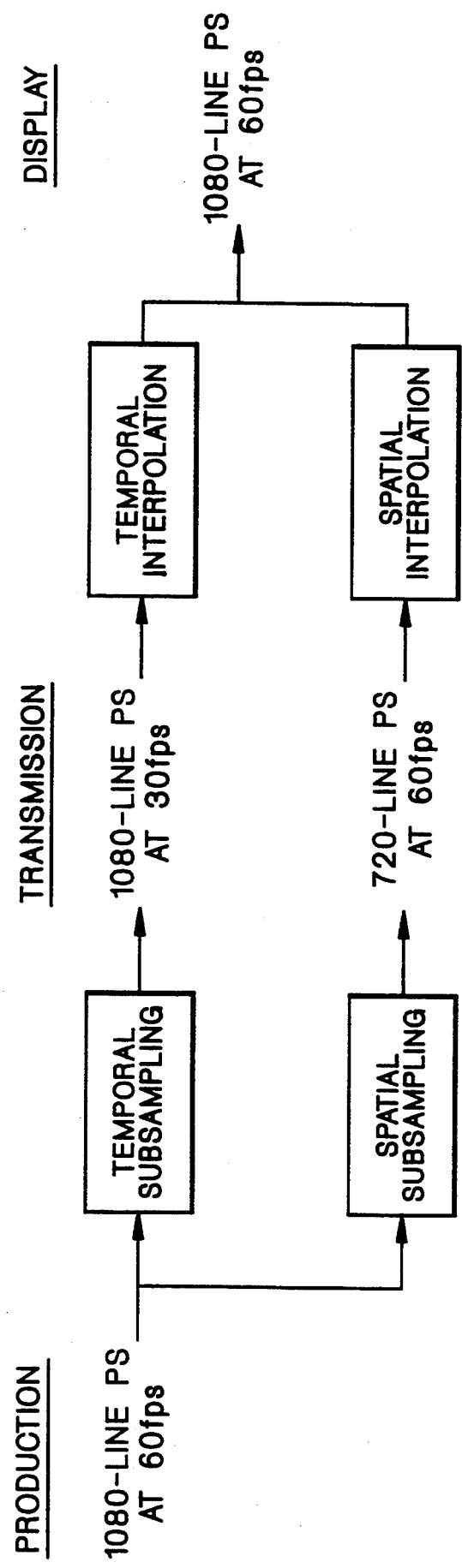
FIG. 9 is a block diagram showing both the production to transmission format conversions and the transmission to display format conversions for a PS-to-PS system.
Figure 10:
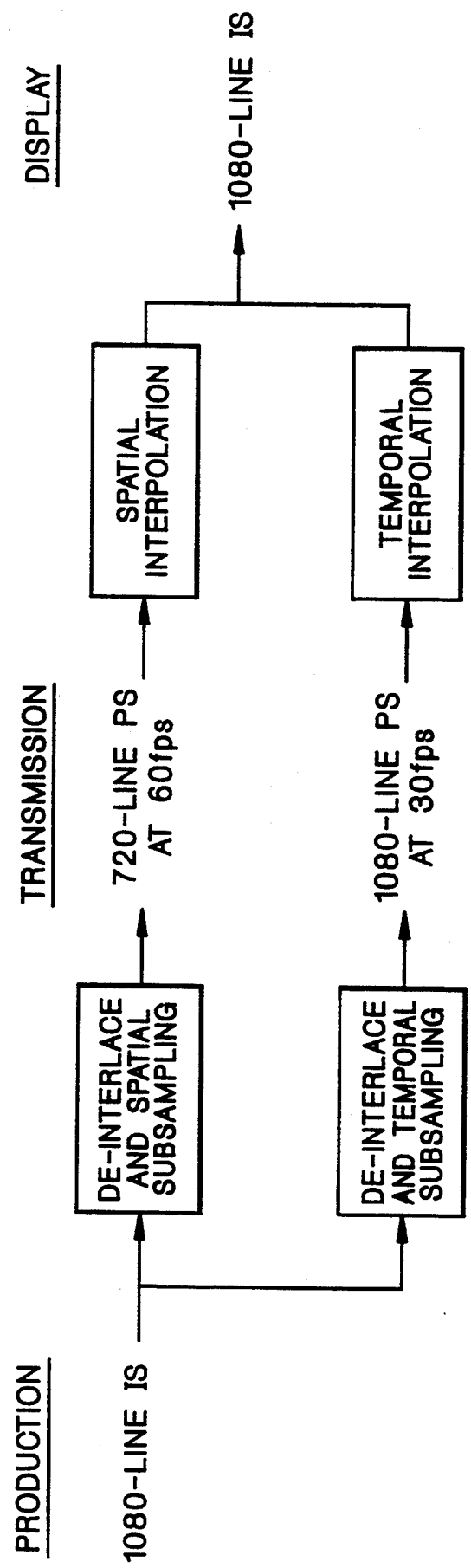
FIG. 10 is a block diagram showing both the production to transmission format conversions and the transmission to display format conversions for an IS-to-IS system.

FIGS. 9 and 10 combine the transformation techniques shown in earlier figures to show the overall format transformations—production to transmission to display—for existing technologies (FIG. 10) and technologies expected to be developed in the future (FIG. 9).

FIG. 10 shows the case of 1080-line IS production technology and 1080-line IS display technology (IS-to-IS system). One technique for transforming 90 the 1080-line IS production format to 1080-line PS at 30 fps transmission format is simply collapsing each set of two interlaced fields into one progressive frame. A technique for performing the temporal interpolation 92 for transforming the 1080-line PS at 30 fps transmission format to the 1080-line IS display format is simply dividing each progressive frame into two interlaced fields. Thus, the preferred embodiment can readily emulate an IS-to-IS system.

An advantage of the invention is that while it is able to emulate an IS-to-IS system, it also provides incentive for the industry to move toward a PS-to-PS system, such as 1080-line PS at 60 fps for production and 1080-line PS at 60 fps for display, as shown in FIG. 9. Doing so avoids the process of collapsing the two interlaced fields into one frame, a step that makes the video compression less efficient. Also, video quality is improved by PS-based production and display formats.

In addition to the systems shown in FIG. 10, other combinations of production and display technologies can be accommodated during the years in which production and display technologies improve.

A reference for various of the transformation techniques and other steps disclosed above is Lim, *Two-Dimensional Signal and Image Processing*, Prentice Hall (1990) and the additional references cited therein (incorporated by reference).

Other Embodiments

Other embodiments are within the following claims. Some examples follow.

The number of active lines of pixels in the transmission formats can vary from the precise numbers given for preferred embodiment; it is, however, preferred that the number of lines be approximately (i.e., within plus or minus 15%) equal to the numbers given.

Although the preferred embodiment and the following claims refer to transmitting and receiving a television signal, the claims are also intended to cover systems and devices that store and read televisions signals to and from a storage media. Thus, e.g., "transmission" as used in the claims encompasses transmission as well as storage, and "television receiver" encompasses devices that receive transmitted signals and devices that read signals from a storage medium.

References to 60 frames per second are intended also as references to 59.94 frames per second (the actual NTSC frame rate). Similarly, references to 30 frames per second are intended also as references to 29.97 frames per second, and references to 24 frames per second to 23.98 frames per second.

The term "frame" is used in the claims to refer not only to a conventional progressive-scan frame but also to one or the other of two interlaced-scan "fields" (two "fields", one containing odd lines and the other containing even lines, make up a full frame in an IS format).

Even though it is not preferred to provide IS transmission formats, the invention contemplates cases in which IS transmission formats can be used. In those cases, the incentive to develop PS technology may be diminished.

The term "production" is used in the claims to refer not only to the output of such true production equipment as a camera, but to other sources of television signals (e.g., a camera output that has been processed by other equipment).

What is claimed is:

1. A television receiver for receiving and decoding a transmitted television signal, wherein the television signal comprises a succession of encoded image frames encoded in a plurality of different transmission formats selected from a set of transmission formats, the set comprising at least two transmission formats that differ from each other in at least two non-program-content characteristics;

wherein the receiver comprises:

means for receiving format identification information transmitted with the encoded image frames identifying the transmission format of the received frames;

means for decoding the identification information to determine the transmission format of the encoded image frames being received, wherein the identification information and transmission formats can change during receipt of the television signal; and means for using the identification information to decode the encoded image frames for at least some of the transmission formats.

2. The receiver of claim 1 wherein the non-program-content characteristics by which the transmission formats differ include spatial resolution and frame rate.

3. The receiver of claim 2 wherein the transmission formats comprise at least three of the following four formats:

a low-spatial-resolution, low-frame-rate transmission format, a low-spatial-resolution, high-frame-rate transmission format, a high-spatial-resolution, low-frame-rate transmission format, and a high-spatial-resolution, high-frame-rate transmission format.

4. The receiver of claim 2 wherein the transmission formats comprise at least:

a low-spatial-resolution, high-frame-rate transmission format, and a high-spatial-resolution, low-frame-rate transmission format.

5. The receiver of claim 1, 2, 3, or 4 further comprising format transformation means for using the decoded identification information to transform the format of the received image frames to a display format.

6. The receiver of claim 5 wherein the display format is different from at least some of the transmission formats.

7. The receiver of claim 6 wherein the spatial resolution ratio between the low-spatial-resolution transmission formats and the high-spatial-resolution formats is a ratio of integers, wherein the integers range from one to ten in value.

8. The receiver of claim 7 wherein the ratio of integers is selected from the group consisting of 3:2 and 2:1.

9. The receiver of claim 6 wherein each of the transmission formats are progressively scanned, and wherein the low-spatial-resolution format has approximately 720 lines of pixels, and the high-spatial-resolution format has approximately 1080 lines of pixels.

10. The receiver of claim 3 wherein the low-frame-rate transmission format has a frame rate of 24 frames per second, and the high-frame-rate transmission format has a frame rate of 30 frames per second.

11. The receiver of claim 3 wherein the set of transmission formats comprises each of the four formats plus a fifth format: a low-spatial-resolution, higher-frame-rate format that has a higher frame rate than that of the low-spatial-resolution, high-frame-rate format.

12. The receiver of claim 11 wherein the higher frame rate is 60 frames per second.

13. The receiver of claim 1, 2, 3, 4, 11, or 12 wherein each of the transmission formats are progressively scanned formats.

14. The receiver of claim 3 wherein the spatial resolution ratio between the low-spatial-resolution transmission formats and the high-spatial-resolution formats is a ratio of integers, wherein the set of transmission formats comprises each of the four transmission formats plus a fifth transmission format: a low-spatial-resolution, higher-frame-rate format that has a higher frame rate than that of the low-spatial-resolution, high-frame-rate format, and wherein each of the transmission formats are progressively scanned formats.

15. The receiver of claim 14 wherein the low-spatial-resolution format has approximately 720 lines of pixels, and the high-spatial-resolution format has approximately 1080 lines of pixels.

16. The receiver of claim 14 wherein the low-frame-rate transmission format has a frame rate of 24 frames per second, the high-frame-rate transmission format has a frame rate of 30 frames per second, and the higher-frame-rate transmission format has a frame rate of 60 frames per second.

17. The receiver of claim 6 wherein the display format uses interlaced scanning.

18. The receiver of claim 14 further comprising format transformation means for using the decoded identification information to transform the format of the received image frames to a display format and wherein the display format uses interlaced scanning.

19. The receiver of claim 6 wherein the display format uses progressive scanning.

20. The receiver of claim 14 further comprising format transformation means for using the decoded identification information to transform the format of the received image frames to a display format and wherein the display format uses progressive scanning.

21. The receiver of claim 5 wherein the receiver comprises means for selectively transforming the received image frames from the transmission format to a second display format.

22. The receiver of claim 5 wherein the format transformation means comprises means for spatial interpolation for processing received image frames with a transmission format having a spatial resolution lower than the spatial resolution of the display format.

23. The receiver of claim 5 wherein the format transformation means comprises means for temporal interpolation for processing received image frames with a transmission format having a frame rate lower than the frame rate of the display format.

24. The receiver of claim 5 wherein the format transformation means comprises means for spatial subsampling for processing received image frames with a transmission format having a spatial resolution greater than the spatial resolution of the display format.

25. The receiver of claim 5 wherein the format transformation means comprises means for temporal subsampling for processing received image frames with a transmission format having a frame rate greater than the frame rate of the display format.

26. A television system for receiving a production television signal having one of a plurality of production formats, processing the production television signal to produce a succession of encoded image frames having a transmission format selected from a set of transmission formats, the set comprising at least two transmission formats that differ from each other in at least two non-program-content characteristics;

wherein the television system comprises:

means for receiving production format identification information identifying the production format of the production television signal;

format transformation means for using the production format identification information to transform the television signal from the production format to one of the transmission formats;

means for processing the television signal to produce the succession of encoded image frames in the transmission format; and means for encoding and transmitting transmission format identification information with the encoded image frames to identify the transmission format, wherein the identification information and transmission formats can change during transmission of the television signal.

27. The system of claim 26 wherein the non-program-content characteristics by which the transmission formats differ include spatial resolution and frame rate.

28. The system of claim 27 wherein the transmission formats comprise at least three of the following four formats:

a low-spatial-resolution, low-frame-rate transmission format, a low-spatial-resolution, high-frame-rate transmission format, a high-spatial-resolution, low-frame-rate transmission format, and a high-spatial-resolution, high-frame-rate transmission format.

29. The receiver of claim 27 wherein the transmission formats comprise at least:

a low-spatial-resolution, high-frame-rate transmission format, and a high-spatial-resolution, low-frame-rate transmission format.

30. The system of claim 26, 27, 28, or 29 wherein the production formats include interlaced scanning formats, the transmission formats include progressive scanning formats, and the format transformation means includes means for transforming the interlaced production formats to progressive formats.

31. The system of claim 30 wherein the production formats include at least two formats having different frame rates and the format transformation means retains at least a portion of that difference in frame rate, so that the resulting transmission formats retain at least a portion of that difference in frame rate.

32. The system of claim 31 wherein the production formats include at least two formats having different spatial resolutions and the format transformation means retains at least a portion of that difference in spatial resolution, so that the resulting transmission formats retain at least a portion of that difference in spatial resolution.

33. The system of claim 26, 27, 28, or 29 further comprising a television receiver for receiving the transmitted television signal, the receiver comprising means for receiving the transmission format identification information transmitted with the encoded image frames identifying the transmission format of the received frames;

means for decoding the transmission format identification information to determine the transmission format of the encoded image frames being received; and format transformation means for using the decoded identification information to transform the format of the encoded image frames from the transmission format to the display format.

34. The subject matter of claim 4 or 29, wherein a different low frame rate is used for the two transmission formats having a low frame rate.

35. The subject matter of claim 34, wherein a different high frame rate is used for the two transmission formats having a high frame rate.

36. A method of receiving and decoding a transmitted television signal, wherein the television signal comprises a succession of encoded image frames encoded in a plurality of different transmission formats selected from a set of transmission formats, the set comprising at least two transmission formats that differ from each other in at least two non-program-content characteristics, the method comprising the steps of:

receiving format identification information transmitted with the encoded image frames identifying the transmission format of the received frames;

decoding the identification information to determine the transmission format of the encoded image frames being received, wherein the identification information and transmission formats can change during receipt of the television signal; and using the identification information to decode the encoded image frames for at least some of the transmission formats.

37. The method of claim 36 wherein the non-program-content characteristics by which the transmission formats differ include spatial resolution and frame rate.

38. The method of claim 37 wherein the transmission formats comprise at least three of the following four formats:

a low-spatial-resolution, low-frame-rate transmission format, a low-spatial-resolution, high-frame-rate transmission format, a high-spatial-resolution, low-frame-rate transmission format, and a high-spatial-resolution, high-frame-rate transmission format.

39. The method of claim 37 wherein the transmission formats comprise at least:

a low-spatial-resolution, high-frame-rate transmission format, and a high-spatial-resolution, low-frame-rate transmission format.

40. The method of claim 36 further comprising the step of using the decoded identification information to transform the format of the received image frames to a display format.

41. The method of claim 40 wherein the display format is different from at least some of the transmission formats.

42. The method of claim 41 wherein the spatial resolution ratio between the low-spatial-resolution transmission formats and the high-spatial-resolution formats is a ratio of integers, wherein the integers range from one to ten in value.

43. The method of claim 42 wherein the ratio of integers is selected from the group consisting of 3:2 and 2:1.

44. The method of claim 41 wherein each of the transmission formats are progressively scanned, and wherein the low-spatial-resolution format has approximately 720 lines of pixels, and the high-spatial-resolution format has approximately 1080 lines of pixels.

45. The method of claim 38 wherein the low-frame-rate transmission format has a frame rate of 24 frames per second, and the high-frame-rate transmission format has a frame rate of 30 frames per second.

46. The method of claim 38 wherein the set of transmission formats comprises each of the four formats plus a fifth format: a low-spatial-resolution, higher-frame-rate format that has a higher frame rate than that of the low-spatial-resolution, high-frame-rate format.

47. The method of claim 46 wherein the higher frame rate is 60 frames per second.

48. The method of claim 36 wherein each of the transmission formats are progressively scanned formats.

49. The method of claim 38 wherein the spatial resolution ratio between the low-spatial-resolution transmission formats and the high-spatial-resolution formats is a ratio of integers, wherein the set of transmission formats comprises each of the four transmission formats plus a fifth transmission format: a low-spatial-resolution, higher-frame-rate format that has a higher frame rate than that of the low-spatial-resolution, high-frame-rate format, and wherein each of the transmission formats are progressively scanned formats.

50. The method of claim 49 wherein the low-spatial-resolution format has approximately 720 lines of pixels, and the high-spatial-resolution format has approximately 1080 lines of pixels.

51. The method of claim 49 wherein the low-frame-rate transmission format has a frame rate of 24 frames per second, the high-frame-rate transmission format has a frame rate of 30 frames per second, and the higher-frame-rate transmission format has a frame rate of 60 frames per second.

52. The method of claim 41 wherein the display format uses interlaced scanning.

53. The method of claim 49 further comprising the step of using the decoded identification information to transform the format of the received image frames to a display format and wherein the display format uses interlaced scanning.

54. The method of claim 41 wherein the display format uses progressive scanning.

55. The method of claim 49 further comprising the Step Of using the decoded identification information to transform the format of the received image frames to a display format and wherein the display format uses progressive scanning.

56. The method of claim 36 further comprising the step of selectively transforming the received image frames from the transmission format to a second display format.

57. The method of claim 40 wherein the format transformation includes the step of spatial interpolation for processing received image frames with a transmission format having a spatial resolution lower than the spatial resolution of the display format.

58. The method of claim 40 wherein the format transformation includes the step of temporal interpolation for processing received image frames with a transmission format having a frame rate lower than the frame rate of the display format.

59. The method of claim 40 wherein the format transformation includes the step of spatial subsampling for processing received image frames with a transmission format having a spatial resolution greater than the spatial resolution of the display format.

60. The receiver of claim 40 wherein the format transformation includes the step of temporal subsampling for processing received image frames with a transmission format having a frame rate greater than the frame rate of the display format.

61. A method for receiving a production television signal having one of a plurality of production formats, processing the production television signal to produce a succession of encoded image frames having a transmission format selected from a set of transmission formats, the set comprising at least two transmission formats that differ from each other in at least two non-program-content characteristics, the method comprising the steps of:

receiving production format identification information identifying the production format of the production television signal;

using the production format identification information to transform the television signal from the production format to one of the transmission formats;

processing the television signal to produce the succession of encoded image frames in the transmission format; and encoding and transmitting transmission format identification information with the encoded image frames to identify the transmission format, wherein the identification information and transmission formats can change during transmission of the television signal.

62. The method of claim 61 wherein the non-program-content characteristics by which the transmission formats differ include spatial resolution and frame rate.

63. The method of claim 62 wherein the transmission formats comprise at least three of the following four formats:

a low-spatial-resolution, low-frame-rate transmission format, a low-spatial-resolution, high-frame-rate transmission format, a high-spatial-resolution, low-frame-rate transmission format, and a high-spatial-resolution, high-frame-rate transmission format.

64. The method of claim 62 wherein the transmission formats comprise at least:

a low-spatial-resolution, high-frame-rate transmission format, and a high-spatial-resolution, low-frame-rate transmission format.

65. The method of claim 61 wherein the production formats include interlaced scanning formats, the transmission formats include progressive scanning formats, and the format transformation step includes the step of transforming the interlaced production formats to progressive formats.

66. The method of claim 65 wherein the production formats include at least two formats having different frame rates and the format transformation step retains at least a portion of that difference in frame rate, so that the resulting transmission formats retain at least a portion of that difference in frame rate.

67. The method of claim 66 wherein the production formats include at least two formats having different spatial resolutions and the format transformation step retains at least a portion of that difference in spatial resolution, so that the resulting transmission formats retain at least a portion of that difference in spatial resolution.

68. The method of claim 39 wherein a different low frame rate is used for the two transmission formats having a low frame rate.

69. The method of claim 64 wherein a different low frame rate is used for the two transmission formats having a low frame rate.

70. The method of claim 68 wherein a different high frame rate is used for the two transmission formats having a high frame rate.

71. A television receiver for receiving and decoding a transmitted television signal, wherein the television signal comprises a succession of encoded image frames encoded in a plurality of different transmission formats selected from a set of transmission formats, the set comprising at least two transmission formats that differ from each other in at least one non-program-content characteristic;

wherein the receiver comprises:

means for receiving format identification information transmitted with the encoded image frames identifying the transmission format of the received frames;

means for decoding the identification information to determine the transmission format of the encoded image frames being received, wherein the identification information and transmission format can change during receipt of the television signal; and means for using the identification information to decode the encoded image frames for at least some of the transmission formats.

72. The receiver of claim 71 wherein the non-program-content characteristics by which the transmission formats differ include spatial resolution.

73. The receiver of claim 71 wherein the non-program-content characteristics by which the transmission formats differ include frame rate.

74. The receiver of claim 71 wherein the non-program-content characteristics by which the transmission formats differ include scanning format (interlaced or progressive).

75. The receiver of claim 71, 72, 73, or 74 further comprising format transformation means for using the decoded identification information to transform the format of the received image frames to a display format.

76. The receiver of claim 75 wherein the display format is different from at least some of the transmission formats.

77. A television system for receiving a production television signal having one of a plurality of production formats, processing the production television signal to produce a succession of encoded image frames having a transmission format selected from a set of transmission formats, that differ from each other in at least one non-program-content characteristic;

wherein the television system comprises:

means for receiving production format identification information identifying the production format of the production signal;

format transformation means for using the production format identification information to transform the television signal from the production format to one of the transmission formats;

means for processing the television signal to produce the succession of encoded image frames in the transmission format; and means for encoding and transmitting transmission format identification information with the encoded image frames to identify the transmission format, wherein the identification information and transmission format can change during transmission of the television signal.

78. The system of claim 77 wherein the non-program-content characteristics by which the transmission formats differ include spatial resolution.

79. The system of claim 77 wherein the non-program-content characteristics by which the transmission formats differ include frame rate.

80. The system of claim 77 wherein the non-program-content characteristics by which the transmission formats differ include scanning format (interlaced or progressive).

81. The system of claim 77, 78, 79, or 80 further comprising format transformation means for using the decoded identification information to transform the format of the received image frames to a display format.

82. The system of claim 81 wherein the display format is different from at least some of the transmission formats.

83. The system of claim 77, 78, 79, or 80 further comprising a television receiver for receiving the transmitted television signal, the receiver comprising display means for displaying the television signal with a display format different from at least some of the transmission formats;

means for receiving the transmission format identification information transmitted with the encoded image frames identifying the transmission format of the received frames;

means for decoding the transmission format identification information to determine the transmission format of the encoded image frames being received; and format transformation means for using the decoded identification information to transform the format of the received image frames from the transmission format to the display format.

84. A method of receiving and decoding a transmitted television signal, wherein the television signal comprises a succession of encoded frames encoded in a plurality of different transmission formats selected from a set of transmission formats, the set comprising at least two transmission formats that differ from each other in at least one non-program-content characteristic, the method comprising the steps of:

receiving format identification information transmitted with the encoded image frames identifying the transmission format of the received frames;

decoding the identification information to determine the transmission format of the encoded image frames being received, wherein the identification information and transmission formats can change during receipt of the television signal; and using the identification information to decode the encoded image frames for at least some of the transmission formats.

85. The method of claim 84 wherein the non-program-content characteristics by which the transmission formats differ include spatial resolution.

86. The method of claim 84 wherein the non-program-content characteristics by which the transmission formats differ include frame rate.

87. The method of claim 84 wherein the non-program-content characteristics by which the transmission formats differ include scanning format (interlaced or progressive).

88. The method of claim 84, 85, 86, or 87 further comprising the step of using the decoded identification information to transform the format of the encoded image frames to a display format.

89. The method of claim 88 wherein the display format is different from at least some of the transmission formats.

90. A method for receiving a production television signal having one of a plurality of production formats, processing the production television signal to produce a succession of encoded image frames having a transmission format selected from a set of transmission formats, the set comprising at least two transmission formats that differ from each other in at least one non-program-content characteristic, the method comprising the steps of:

receiving production format identification information identifying the production format of the production television signal;

using the production format identification information to transform the television signal from the production format to one of the transmission formats;

processing the television signal to produce the succession of encoded image frames in the transmission format; and encoding and transmitting transmission format identification information with the encoded image frames to identify the transmission format, wherein the identification information and transmission formats can change during transmission of the television signal.

91. The method of claim 90 wherein the non-program-content characteristics by which the transmission formats differ include spatial resolution.

92. The method of claim 90 wherein the non-program-content characteristics by which the transmission formats differ include frame rate.

93. The method of claim 90 wherein the non-program-content characteristics by which the transmission formats differ include scanning format (interlaced or progressive).

* * * * *

UNITED STATES PATENT AND TRADEMARK OFFICE
CERTIFICATE OF CORRECTION

PATENT NO.   : 5,444,491

DATED        : August 22, 1995

INVENTOR(S)  : Jae S. Lim

It is certified that error appears in the above-identified patent and that said Letters Patent is hereby corrected as shown below:

Cover page, under [56] References Cited, U.S. PATENT DOCUMENTS, in the "Callens" reference, "158 A" should be --15BA--.

Cover page, under [56] References Cited, OTHER PUBLICATIONS, in the "Monta et al." reference, "Systems" should be --System--.

Cover page, under [57] ABSTRACT, replace the abstract with the following:

A television receiver for receiving and decoding a transmitted television signal made up of a succession of encoded image frames encoded in a plurality of different transmission formats, with at least two of the transmission formats differing from each other in non-program-content characteristics (e.g., frame rate, spatial resolution). The receiver receives format identification information transmitted with the encoded image frames, and decodes the identification information to determine the transmission format of the frames being received. The identification information and transmission formats can change during receipt of the television signal. The identification information is used to decode the encoded image frames for at least some of the transmission formats.

UNITED STATES PATENT AND TRADEMARK OFFICE
CERTIFICATE OF CORRECTION

PATENT NO. : 5,444,491

DATED : August 22, 1995

INVENTOR(S) : Jae S. Lim

It is certified that error appears in the above-identified patent and that said Letters Patent is hereby corrected as shown below:

Cover page 2, under [56] References Cited, U.S. PATENT DOCUMENTS, in the "Hirahata et al." reference, "2/1992" should be --7/1992--.

Col. 13, line 46, "Step Of" should be --step of--.

Signed and Sealed this

Ninth Day of January, 1996

*Attest:*

*Attesting Officer*

BRUCE LEHMAN

*Commissioner of Patents and Trademarks*